United States Patent [19]

Icenhower et al.

[11] Patent Number: 5,129,624
[45] Date of Patent: Jul. 14, 1992

[54] VALVE STEM SEALING MEANS FOR PREVENTION OF FUGITIVE EMISSIONS

[75] Inventors: John D. Icenhower; Stephen M. Horvath, both of Sulphur Springs, Tex.

[73] Assignee: M&FC Holding Company, Inc., Wilmington, Del.

[21] Appl. No.: 614,142

[22] Filed: Nov. 15, 1990

[51] Int. Cl.5 .................. F16K 41/04; F16J 15/22; F16J 15/24
[52] U.S. Cl. .................. 251/214; 137/246.22; 251/283; 277/72 FM; 277/112; 277/125; 277/DIG. 6
[58] Field of Search ........ 137/246.12, 246.22; 251/214, 283; 277/72 FM, 124, 125, 102, 110, 112, 204, DIG. 6

[56] References Cited

U.S. PATENT DOCUMENTS

| | | | |
|---|---|---|---|
| 3,445,087 | 5/1969 | Priese et al. | 251/214 |
| 3,537,682 | 11/1970 | Priese | 251/214 |
| 3,627,260 | 12/1971 | Grove | 251/214 |
| 4,006,881 | 2/1977 | Gaillard | 277/124 |
| 4,034,776 | 7/1977 | Eshghy | 137/246.22 |
| 4,174,092 | 11/1979 | Macleod | 251/214 |
| 4,260,131 | 4/1981 | Kindersley | 251/214 |
| 4,305,567 | 12/1981 | Lunt | 251/214 |
| 4,328,974 | 5/1982 | White et al. | 251/214 |
| 4,379,557 | 4/1983 | Saka | 277/59 |
| 4,394,023 | 7/1983 | Hinojosa | 277/124 |
| 4,475,712 | 10/1984 | DeJager | 251/214 |
| 4,516,752 | 5/1985 | Babbitt et al. | 251/214 |
| 4,577,872 | 3/1986 | Bake et al. | 277/12 |
| 4,640,305 | 2/1987 | Johnson | 137/312 |
| 4,892,320 | 1/1990 | Tuckmantel | 277/125 |
| 4,930,748 | 6/1990 | Gonsior | 251/163 |

FOREIGN PATENT DOCUMENTS 256504 9/1926 United Kingdom .

Primary Examiner—George L. Walton
Attorney, Agent, or Firm—Lorusso & Loud

[57] ABSTRACT

A valve stem sealing means comprising first and second seal assemblies, the first seal assembly being proximate a valve plug and comprising an expandable ring adapted to be expanded by pressure within the valve to effect a first seal around the valve stem, and the second seal assembly being nearer a free end of the valve stem and comprising a second expandable ring adapted to be expanded by contact with a selectively movable member to effect a second seal around the stem.

3 Claims, 2 Drawing Sheets

VALVE STEM SEALING MEANS FOR PREVENTION OF FUGITIVE EMISSIONS

BACKGROUND OF THE INVENTION

1. Field of the Invention

This invention relates to valves and is directed more particularly to a valve stem sealing means for prevention of fugitive emissions.

2. Description of the Prior Art

It is well known in the valve art to provide a valve stem with sealing means to prevent escape of fluid from the valve flow passageway, around the stem and into the atmosphere. Generally, such valve stem seals have proven effective in preventing undue leakage past the valve stem.

However, in view of environmental concerns, it has become important to ensure against leakage that in other times might have been viewed as acceptable, particularly when environmentally damaging materials or substances are being flowed through the valve.

The United States Environmental Protection Agency (EPA), acting under The Clean Air Act, has mandated a reduction of emissions in various plants and refineries, including stack emissions and "fugitive emissions". In contrast to stack emissions, which emanate from obvious point sources, fugitive emissions emanate from a variety of nonpoint sources, primarily in the form of leakage, including leakage from valve stems.

In some applications, it is beneficial to have "backup" sealing assemblies, that is, a sealing assembly which comes into play only upon failure of another sealing assembly. Even where no leakage has been found from "standard" valves, operators are able to receive more "credit" from the EPA by substituting for their standard valves, valves with double stem seals.

Further, it is deemed desirable to provide sets of sealing assemblies in which the seals are tightened by different means, as by one seal assembly responding automatically to changing conditions within the valve and another seal assembly responding to manual operation, or a condition different from that triggering the first seal assembly.

SUMMARY OF THE INVENTION

It is, therefore, an object of the present invention to provide a valve stem sealing means in which there are first and second seal assemblies removed from each other and operative independently of each other, such that one assembly serves as a back-up to the other.

A further object of the invention is to provide such a valve stem sealing means in which the two seal assemblies are activated by different forces.

A still further object of the invention is to provide such a valve stem sealing means in which a first seal assembly responds automatically to conditions in the valve and the second seal assembly is selectively adjustable from outside the valve.

A still further object of the invention is to provide such a valve in which there are non-destructive means for determining the effectiveness of the automatic first seal assembly and for testing the effectiveness of the adjustable second seal assembly.

With the above and other objects in view, as will hereinafter appear, a feature of the present invention is the provision of a valve stem sealing means in a valve having a casing, a flow passageway through the casing, a bore in the casing intersecting the passageway, a valve plug disposed in the passageway, a valve stem housing portion of the casing having the bore therein, and a valve stem disposed in the bore and connected to the valve plug, the valve stem sealing means being disposed in the bore and comprising first and second seal assemblies, the first seal assembly being proximate the valve plug and comprising expandable ring means adapted to be expanded by pressure within the valve to effect a tighter first seal around the stem, and the second seal assembly being proximate a free end of the housing portion and comprising a second expandable ring means adapted to be expanded by contact with a selectively movable member to effect a tighter second seal around the stem.

In accordance with a further feature of the invention, there are provided means for inspecting the effectiveness of the first seal assembly, without the need for disassembling the valve, and for testing the effectiveness of the second seal assembly.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENT

Figure 1:
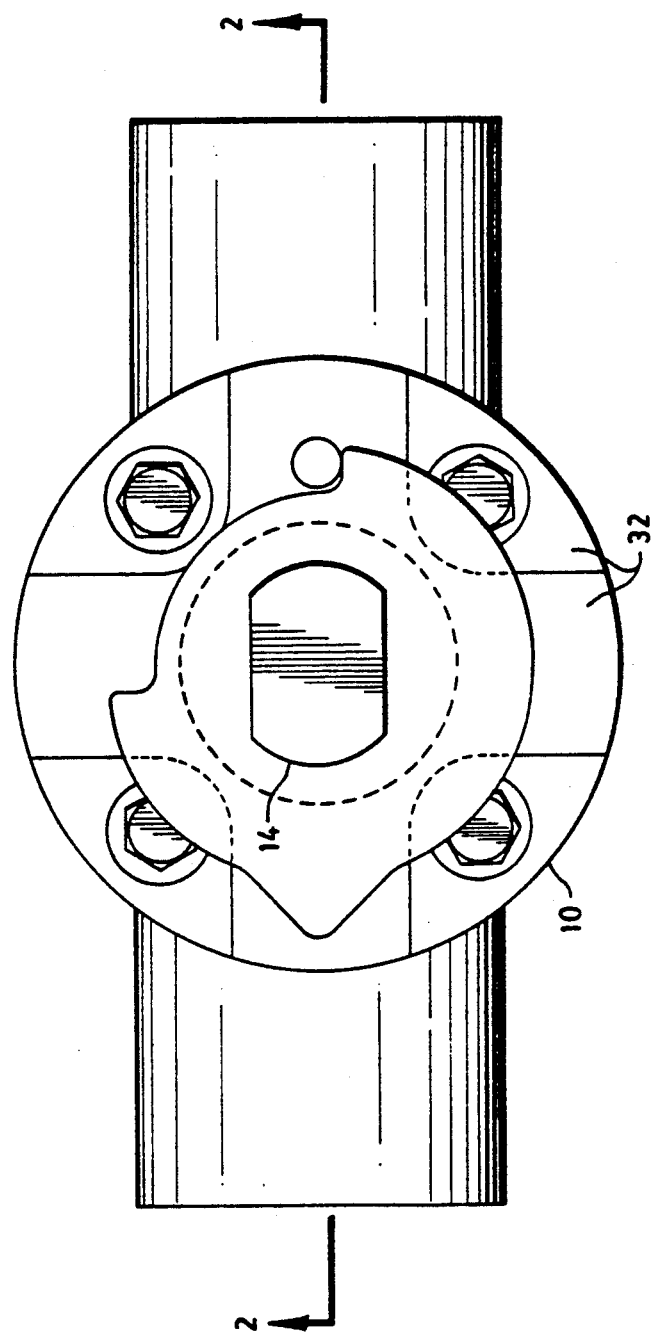
FIG. 1 is a top plan view of a valve stem housing portion of a valve casing.

Referring to the drawings, there will be seen an illustrative valve having a valve stem sealing means of the present invention. A valve casing 2 is provided with a flow passageway 4 and a bore 6 intersecting the passageway 4. A valve plug 8 is disposed in the passageway 4 and is movable between open and closed positions therein. A valve stem housing portion 10 of the casing 2 upstands from the remainder of the casing and has the bore 6 therein. A valve stem 12 is disposed in the bore 6 and is connected to the valve plug 8. A handle 14, or other turning means, is connected to the valve stem 12 to facilitate opening and closing of the valve.

In the housing 10, there is provided valve stem sealing means 20, including a first seal assembly 22. The first seal assembly 22 is disposed at an end of the valve stem 12 proximate the valve plug 8 and comprises first expandable ring means 24, which comprises one or more first expandable rings 26, each ring preferably comprising alternating ribbons of graphite and polytetrafluroethylene.

As may be seen in the drawings, an inside radius of each of the first expandable rings 26 abuts the valve stem 12, and an outside radius of each of the first expandable rings 26 abuts a wall 28 of the bore 6. The first expandable rings 26 are held against movement axially of the valve stem 12 by a tubular portion 30 of a gland member 32. The tubular portion 30 has an edge 31 abutting an upper surface of the expandable ring means 24.

The first seal assembly 22 further includes a rigid ring 34 disposed on a shoulder 38 in the bore 6, and between the valve stem 12 and the wall 28 and beneath the first expandable rings 26, as viewed in the drawings. The rigid ring 34 surrounds and abuts the valve stem 12 radially inwardly of the ring and abuts the housing wall 28 radially outwardly thereof.

Figure 2:
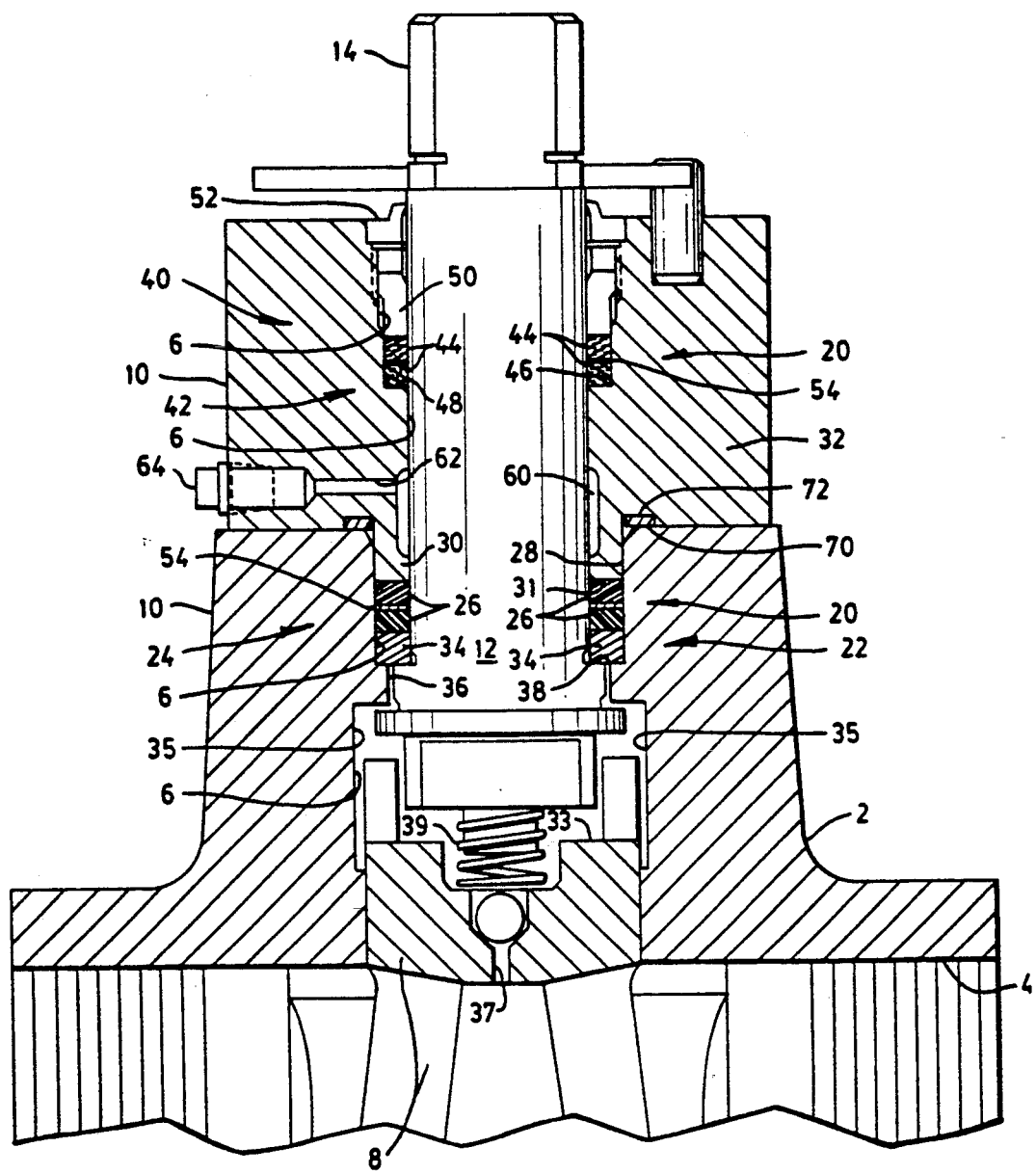
FIG. 2 is a cross-sectional elevational view taken along line 2—2 of FIG. 1, of the valve stem housing portion of FIG. 1, a valve stem shown in elevation disposed in the housing, and valve stem sealing means in the housing, illustrative of an embodiment of the invention.

The valve casing 2 and the valve plug 8 define a valve sealant chamber 35 provided with valve means (not shown) by which sealant lubricant may be introduced into the chamber 35 under pressure. The sealant lubricant flows into and fills the valve sealant chamber and serves the purpose of lubricating the operational parts of the valve while sealing the valve plug with respect to the casing. The valve plug 8 is balanced in the valve casing in part by substantially equal pressure exerted on the top 33 and bottom (not shown) of the valve plug 8. Pressure is applied to the top 33 of the valve plug by a port 37 interconnecting the flow passageway 4 and the valve sealant chamber 35. A similar arrangement (not shown) is provided for the bottom of the valve plug 8. Because of different sizes of the upper and lower end surfaces of the valve plug, a coil spring 39 serves to provide an additional bias on the valve plug toward its lower end, as viewed in FIG. 2. The arrangement of balancing forces is described in some detail in U.S. Pat. No. 4,305,567, issued Dec. 15, 1981, in the name of William G. Lunt. Accordingly, the valve sealant chamber 35 contains pressure greater than the pressure in the flow passageway 4, by virtue of the pressure injected sealant, or equal to the pressure in the flow passageway, by virtue of the flow of fluid from the flow passageway 4 into the chamber by way of the port 37.

The housing 10 is provided with conduit means 36 extending from the valve sealant chamber 35 to an undersurface of the rigid ring 34. Fluid in the conduit means 36 exercises pressure on the undersurface of the rigid ring 34, and thereby on the first expandable rings 26, causing axial compression and radial expansion of the first expandable rings 26, to effect a tight seal between the first expandable ring means 24 and the stem 12. The rigid ring 34 is preferably of a metallic material.

The valve stem sealing means 20 further includes a second seal assembly 40 proximate a free end of the housing 10 and comprising second expandable ring means 42 comprising one or more second expandable rings 44. The second expandable rings 44 preferably are formed of carbon filament of fiber which has been coated with a dispersion of polytetrafluoroethylene, with a latex binder to provide good adhesion between the polyetetrafluoroethylene and the carbon filament material.

The second expandable rings 44 are disposed around the valve stem 12 with the internal radius of each of the second expandable rings 44 abutting the stem 12 and the external radius of each of the second expandable rings abutting a second internal wall 46 of the bore 6. A lowermost of the second expandable rings 44 rests upon a second shoulder 48 formed in the gland member 32 portion of the housing 10. Abutting an uppermost of the second expandable rings 44 is a collar member 50 threadedly engaged with the gland member 32. The collar member 50 is threadedly rotatable within the gland member 32, rotation of the collar member 50 causing movement of the collar member axially along the stem 12, to force the second expandable rings to compress in a direction axially of the stem 12 and expand in directions radially of the stem, to effect a tight seal between the gland member 32 and the stem 12. After setting of the second seal assembly 40, an elastomer weather seal 52 may be placed in a position around the stem 12 to protect the collar member 50 from the elements.

The first and second seal assemblies 22, 40 may include washers 54, preferably of zinc, the washers 54 acting as sacrificial anodes, preventing stem corrosion due to galvanic action of water that may be present, along with the carbon fiber rings 44, the part graphite rings 26, and the stem 12, typically of stainless steel.

In the gland member 32, and around the stem 12, there is disposed an annular chamber 60 in communication with a radial passageway 62 adapted to be closed by a plug 64. The plug 64 may be removed for inspection purposes, to determine whether there is leakage through the first seal assembly 22. The passageway 62 and the chamber 60 also facilitate introduction of pressure to verify sealing integrity of the second seal assembly 40. The chamber 60 may still further function as a "trash trap", a harmless repository for any transient sealing material present in the assembly.

Between the valve stem housing portion 10 and the gland member 32 there may be a secondary seal comprising a gasket 70 disposed in an annular groove 72 in the gland member 32.

In operation, the first seal assembly 22 is set automatically in response to pressure within the valve, and the second seal assembly 40 is set selectively by an operator. The plug 64 may be pulled to check the integrity of the first seal assembly and to pressure test the integrity of the second seal assembly.

It is to be understood that the present invention is by no means limited to the particular construction herein disclosed and/or shown in the drawings, but also comprises any modifications or equivalents within the scope of the claims.

What is claimed is:

1. In a valve having a casing, a flow passageway through said casing, a bore in said casing intersecting said passageway, a valve plug disposed in said passageway, a valve stem housing comprising a portion of said casing and a gland member mounted thereon, said valve stem housing having said bore therein, a valve stem disposed in said bore and connected to said valve plug, and valve stem sealing means disposed in said bore, an improvement wherein said valve stem sealing means comprise a first seal assembly proximate said valve plug and disposed in said portion of said housing, and a second seal assembly proximate a free end of said valve stem housing and disposed in said gland member, said first seal assembly comprising first expandable ring means, an inside radius of said first expandable ring means abutting said stem and an outside radius of said first expandable ring means abutting a wall of said portion of said casing, said first seal assembly first expandable ring means comprising a plurality of substantially adjacent first expandable rings, said first seal assembly comprising a rigid ring disposed between said plurality of first expandable rings and said flow passageway, said rigid ring being disposed on a shoulder in said bore in said portion of said casing, and on a shoulder on said stem, said stem shoulder being in the same plane as said shoulder in said bore, said rigid ring being in contact with a first of said plurality of first expandable rings, said first expandable ring means being held against substantial axial movement along said stem in part by said shoulder portion of said casing bore, in part by said stem shoulder, and in part by said gland member, said housing bore shoulder and said stem shoulder defining therebetween a fluid pressure conduit leading to said rigid ring, wherein fluid in said conduit impinges upon said rigid ring and urges said rigid ring against said first expandable ring means, causing said first expandable ring means to expand widthwise to effect a seal around said stem, said second seal assembly comprising second expandable ring means, an inside radius of said second expandable ring means abutting said stem and an outside radius of said second expandable ring means abutting a wall of said gland member, said second expandable ring means being held against substantial axial movement along said stem in part by said gland member and in part by collar means threadedly and rotatably mounted in said gland member, said second seal assembly second expandable ring means comprising a plurality of second expandable rings and said collar means comprising a rigid collar rotatable to move said collar axially of said stem, said collar including a tubular portion having an edge for bearing against one of said plurality of second expandable rings, said gland member comprising an annularly shaped body, said body having a rigid tubular portion extending axially therefrom, an edge of said tubular portion being in contact with a second of said plurality of first expandable rings.

2. In a valve having a casing, a flow passageway therethrough, a bore intersecting said passageway, a valve plug disposed in said passageway, a valve stem housing portion of said casing having said bore therethrough, a valve stem disposed in said bore and connected to said valve plug, and stem sealing means disposed in said bore, an improvement wherein said stem sealing means comprises a first seal assembly proximate said valve plug and a second seal assembly proximate a free end of said housing portion, said first seal assembly comprising a rigid ring disposed on a shoulder in said housing bore and on a shoulder on said stem, said stem shoulder being in the same plane as said housing bore shoulder, said rigid ring surrounding and abutting said stem radially inwardly of said rigid ring and abutting a housing internal wall radially outwardly of said rigid ring, first expandable ring means disposed in said rigid ring and abutting said stem and said internal wall, a gland portion of said housing having a tubular portion extending axially therefrom with an edge abutting an upper surface of said first expandable ring means, said housing bore shoulder, said stem shoulder, and said gland tubular portion edge retaining said first seal assembly against substantial movement axially of said stem, and fluid pressure conduit means defined by and between said housing bore shoulder and said stem shoulder and in communication with said flow passageway and extending to a surface of said rigid ring opposite a surface thereof abutting said first expandable ring means, wherein fluid in said conduit means impinges upon said rigid ring and urges said rigid ring against said first expandable ring means, causing said first expandable ring means to expand widthwise of said stem to effect a seal between said first expandable ring means and said stem, and said second sealing means comprises second expandable ring means disposed on a second shoulder in said housing bore, said second expandable ring means surrounding and abutting said stem radially inwardly of said second expandable ring means and abutting a second housing wall radially outwardly of said second expandable ring means, a rigid collar means in said gland portion of said housing, said rigid collar means abutting said second expandable ring means, said stem and said second housing wall, said gland portion being threadedly engaged with said rigid collar means, whereby upon rotation of said collar means said collar means is moveable axially of said stem toward said valve plug and axially of said stem against said second expandable ring means to cause said second expandable ring means to expand widthwise of said stem to effect a seal between said second expandable ring means and said stem and between said second expandable ring means and said second housing wall.

3. The valve stem sealing means in accordance with claim 1 wherein operation of one of said first and second seal assemblies is independent of and unaffected by operation of the other of said first and second seal assemblies.

* * * * *